March 4, 1958 — I. D. SMITH ET AL — 2,825,553
AIRCRAFT STRUT CONSTRUCTION
Filed Feb. 25, 1955

INVENTORS
IRA D. SMITH
BY OSCAR HOFFMAN
ATTORNEY

United States Patent Office 2,825,553
Patented Mar. 4, 1958

2,825,553

AIRCRAFT STRUT CONSTRUCTION

Ira D. Smith, Bedford, and Oscar Hoffman, University Heights, Ohio, assignors to The Cleveland Pneumatic Tool Company, Cleveland, Ohio, a corporation of Ohio Application February 25, 1955, Serial No. 490,571

1 Claim. (Cl. 267—64)

This invention relates generally to aircraft landing gear and more particularly to a new and improved strut structure incorporating a fluid shock absorber and spring.

It is an important object of this invention to provide a new and improved aircraft strut wherein the weight of the strut for a given load carrying capacity is reduced over conventional prior art constructions.

It is another important object of this invention to provide an aircraft strut incorporating a fluid shock absorber and spring wherein a thin wall construction may be utilized in the main structural members of the strut.

It is still another object of this invention to provide an aircraft strut incorporating a high pressure air-oil shock absorber and spring.

It is still another object of this invention to provide a shock absorber structure incorporated in an aircraft strut which utilizes only one sliding seal in the shock absorber.

Further objects and advantages will appear from the following description and drawings, wherein.

Aircraft landing gears must be structurally able to withstand large loads that occur when the aircraft first touches the ground in a landing and during the ground handling of the ship. The components of force which are present are basically the vertical force created by the weight of the ship and the lateral or drag forces. In order to provide a strut which will satisfactorily absorb both the vertical and drag forces, it is desirable to provide main structural elements having a relatively large diameter and relatively thin walls so that a large section modulus is produced in the resulting column with a relatively low structural weight.

Figure 1:
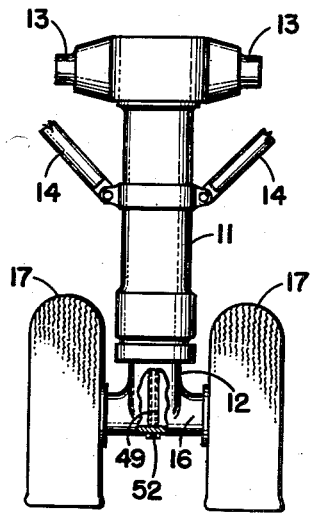
Figure 1 is a side elevation of an aircraft strut showing the external appearance.

Referring to Figure 1, the preferred strut according to this invention provides upper and lower cylindrical telescoping members 11 and 12, the upper of which is formed with bosses 13 providing means for mounting the strut on the airframe itself and lateral support links 14 to produce lateral stability. The lower telescoping member 12 is provided with laterally extending wheel mounting portions 16 on which wheels 17 are journaled.

Mounted on the upper end of the lower telescoping member 12 by means of a threaded retainer 18 is a first annular bearing member 19 adapted to slide along the inner surface of the upper telescoping member 11. A second annular bearing 21 is mounted at the lower end of the upper telescoping member 11 by means of a threaded cap 22. This bearing is proportioned to engage with the outer surface of the lower telescoping member 12. The bearings 19 and 21 are arranged so that there is substantial spacing between them even when the strut is in the extended position so the telescoping members are able to withstand substantial lateral loads.

Positioned within the strut is a shock absorber and spring assembly 20 which is utilized to resist axial motion of the lower telescoping member 12 upwardly relative to the upper telescoping member 11 and to support the load of the aircraft when it is on the ground. This shock absorber and spring includes a bulkhead 23 formed with an axially extending cylindrical portion 24 and a plunger tube 26, the lower end of which is axially movable within the cylindrical portion 24. A fluid seal 27 mounted on the plunger tube 26 engages the cylindrical portion 24 preventing leakage therebetween; and a slide bearing 28 mounted on the upper end of the cylindrical portion 24 by a retaining member 29 provides lateral support between these two members.

Mounted on the bulkhead 23 by a thread connection is a metering pin 31 which projects axially along the cylindrical portion 24 through an orifice 32 in an orifice plate 33 at the lower end of the plunger tube 26. Welded on the upper end of the plunger tube 26 is a dome member 34 provided with a charging fitting 36. The plunger tube 26 and the cylindrical portion 24 cooperate to define a cavity divided into an upper chamber 37 and a lower chamber 38 by the orifice plate 33. The chamber 38 and the lower part of the chamber 37 are filled with an oil and the area above the oil in the chamber 37 is charged with air under pressure. Because the shock absorber is under pressure, there is a reaction force which urges the plunger tube 26 and the bulkhead 23 apart which force is utilized to support the static loads.

Figure 2:
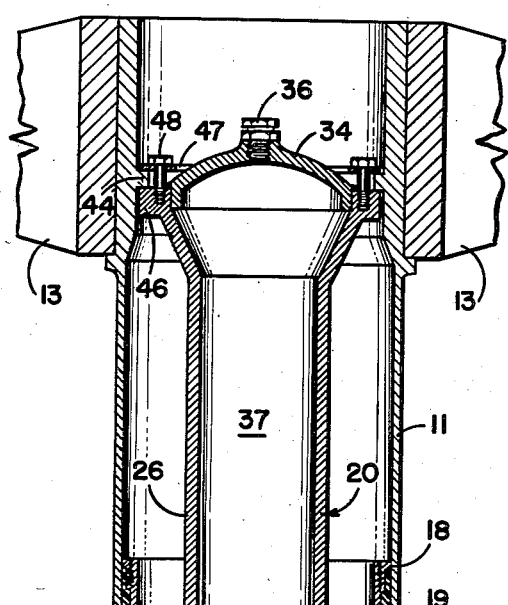
Figure 2 is a longitudinal section of the preferred form of this invention in its extended position; and, Figure 3 is a fragmentary longitudinal section showing the position the elements assume when the shock absorber is at the lower end of its stroke.
Figure 3:
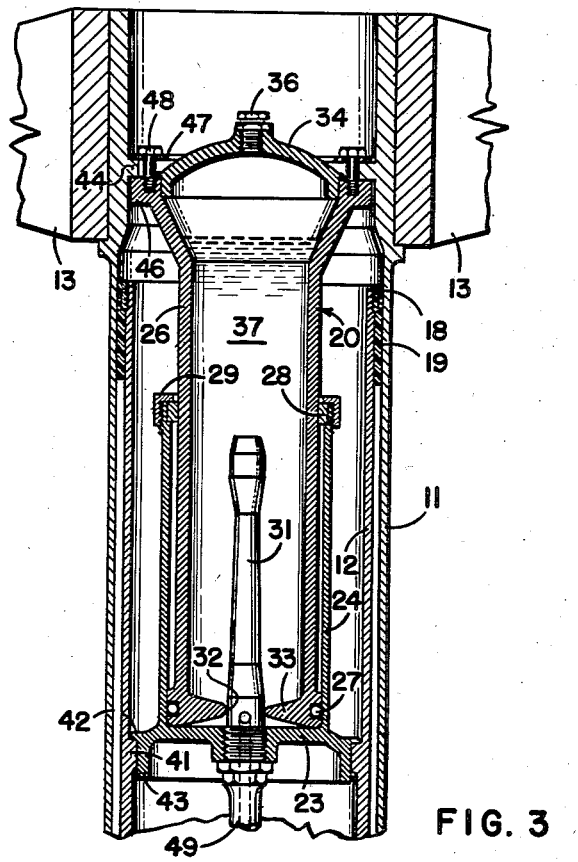

When the bulkhead 23 moves upward relative to the plunger tube 26, high pressure is created within the chamber 38 which causes the oil to flow around the metering pin 31 through the orifice 32 into the chamber 37. This flow through a restriction absorbs energy in the usual manner and produces the function of shock absorbing. The shock absorber is mounted within the two telescoping members 11 and 12 by means of a flange construction best seen in Figures 2 and 3. The lower telescoping member 12 is formed with an inwardly projecting flange 41 which is engaged by a radially extending flange 42 formed on the bulkhead 23 thus preventing axial motion of the bulkhead 23 downwardly relative to the lower telescoping member 12. The bulkhead 23 is also formed with an axially extending skirt portion 43 which engages the flange 41 and radially locates the bulkhead. The upper telescoping member is also formed with an inwardly extending flange 44, the lower side of which is engaged by a radially extending flange 46 formed on the plunger tube 26. A mounting plate 47 engages the upper side of the flange 44 and bolt fasteners 48 connect the mounting plate 47 to the plunger tube.

A drain tube 49 is connected to the chamber 38 by means of a passage 51 in the metering pin and is closed at its lower end by a plug member 52 shown in Figure 1.

As previously described, an aircraft landing gear must be able to withstand large loads which can be resolved into two basic classes; the axial or vertical loads due to the weight mass of the aircraft and the lateral or drag loads which occur during landings and ground handling. Those skilled in the art will recognize that in the structure shown the telescoping members 11 and 12 may be made virtually any desired diameter to produce a column having the desired section modulus without increasing the overall weight of the complete strut. This is due to the fact that the telescoping members are not subjected to the bursting stresses of the fluid within the shock and spring assembly 20 which stresses require a minimum wall thickness. In addition, the upper telescoping member 11 is only subjected to lateral or drag loading and does not receive vertical loading since the shock absorber and spring assembly carries the entire vertical load from the lower telescoping member 12 to mounting bosses 13. It is true that the lower telescoping member 12 does receive both lateral and vertical loads; however, its diameter may be properly chosen without regard to bursting stresses to give the optimum load carrying capacity for both classes of loads.

Since the shock absorber and spring assembly 20 may be designed without regard to its effect on the strength and weight of the telescoping members 11 and 12, it is possible to select the size and operating pressure which will give the most efficient overall operation for a given weight. Generally speaking, the use of a smaller diameter shock absorber and spring assembly operating at higher pressures results in a net savings in weight since the amount of oil necessary for operation and the weight of the various elements is reduced. These factors all combine to reduce the weight of the strut for any given load carrying capacity.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

We claim:

A cantilever aircraft landing gear adapted to withstand axial and lateral loads comprising upper and lower telescoping casings capable of relative axial motion provided with bearing therebetween preventing relative lateral motions, said upper casing being adapted to be mounted on an aircraft, a shock absorber and spring assembly inwardly spaced from and co-axial with said casings, said assembly including upper and lower telescopic members co-operating to define a variable volume cavity, orifice means carried by said upper member dividing said cavity into upper and lower chambers, liquid filling said lower chamber and a portion of said upper chamber, gas under pressure filling the remainder of said upper chamber whereby a force is developed urging said members apart, first means connecting said lower member to said lower casing at a point intermediate the ends of said lower casing transmitted said force directly to said lower casing, second means connecting said upper member and upper casing preventing relative axial motion therebetween, the wall of said lower casing below the point of connection of said first means being thicker than both the wall of said lower casing thereabove and the wall of said upper casing, and the wall of said upper member being thicker than the wall of said lower member.

References Cited in the file of this patent

UNITED STATES PATENTS

| | | |
|---|---|---|
| 1,791,484 | Dowty | Feb. 3, 1931 |
| 2,150,495 | Dowty | Mar. 14, 1939 |
| 2,443,587 | Tack | June 15, 1948 |
| 2,516,667 | Bachman | July 25, 1950 |
| 2,670,160 | Neilson et al. | Feb. 23, 1954 |

FOREIGN PATENTS

| | | |
|---|---|---|
| 435,846 | Italy | May 25, 1948 |
| 866,370 | France | May 5, 1941 |